(12) United States Patent
Olson

(10) Patent No.: US 7,127,242 B1
(45) Date of Patent: Oct. 24, 2006

(54) INTER DEVICE PERSONAL INFORMATION TRANSFER

(75) Inventor: Anthony M. Olson, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 610 days.

(21) Appl. No.: 09/878,755

(22) Filed: Jun. 11, 2001

(51) Int. Cl.
*H04Q 7/20* (2006.01)

(52) U.S. Cl. ............... 455/426; 455/564; 455/418; 455/557; 455/410; 379/61; 379/58

(58) Field of Classification Search ............ 455/426, 455/564, 418, 557, 410, 420; 379/61, 58, 379/355
See application file for complete search history.

(56) References Cited

U.S. PATENT DOCUMENTS

| | | | |
|---|---|---|---|
| 5,062,132 A * | 10/1991 | Yasuda et al. | 455/557 |
| 5,367,698 A | 11/1994 | Webber et al. | |
| 5,525,276 A * | 6/1996 | Okuyama et al. | 264/29.3 |
| 5,794,142 A * | 8/1998 | Vanttila et al. | 455/419 |
| 5,812,946 A * | 9/1998 | Nakabayashi et al. | 455/426.1 |
| 5,930,703 A * | 7/1999 | Cairns | 455/418 |
| 5,974,312 A * | 10/1999 | Hayes et al. | 455/419 |
| 5,991,749 A | 11/1999 | Morrill, Jr. | |
| 5,991,818 A | 11/1999 | Williams | |
| 6,041,229 A * | 3/2000 | Turner | 455/420 |
| 6,072,795 A | 6/2000 | Poulter | |
| 6,128,647 A | 10/2000 | Haury | |
| 6,138,009 A * | 10/2000 | Birgerson | 455/419 |
| 6,147,773 A | 11/2000 | Taylor et al. | |
| 2002/0004386 A1 * | 1/2002 | Simon | 455/419 |

* cited by examiner

*Primary Examiner*—Matthew Anderson
*Assistant Examiner*—Minh Dao
(74) *Attorney, Agent, or Firm*—Ross F. Hunt, Jr.; Stiles & Harbison PLLC

(57) ABSTRACT

Personal information is transferred between an old appliance and a new appliance by use of communication capabilities of the appliances. A transfer facility on the old appliance is used to select the information to transfer. A receive facility on the new appliance is provided to verify the information prior to finalizing the transfer. The personal information is translated by either facility as desired, and the information is optionally encrypted, compressed and verified. The facilities are downloaded from a network and are modified based on characteristics of the appliances exchanging personal information. The personal information includes preferences for operation of the appliance. Telephony and wireless communication methods such as cellular are employed for the exchange in various embodiments.

23 Claims, 5 Drawing Sheets

INTER DEVICE PERSONAL INFORMATION TRANSFER

FIELD OF THE INVENTION

The present invention relates to personal devices and in particular to transfer of personal information between devices.

BACKGROUND OF THE INVENTION

Many personal devices such as cellular telephones, digital assistants and other appliances contain personalized data. Personalized data includes telephone and address book information, speed dial numbers, task lists, calendar information, home page, book-marked web sites, password histories, user settings, graphical interface configurations and other information. Technology is changing rapidly, and users upgrade to new higher function appliances quite often. When changing or upgrading to new devices, personal information in the old device needs to be entered in a new device. It is time consuming to manually enter the new information into the new device.

Some device providers have tools that can obtain information from the old device and transfer it to the new device provided both devices are communicating directly with the tool. Some personal digital assistant appliances have the capability to beam a business card or file to another digital assistant via infrared ports, or to transfer information to a computer system via network. However, it is difficult to transfer personal information between such appliances when switching or upgrading to new appliances. It is even harder to transfer appliance preference personal information that customizes the operation of the appliance.

SUMMARY OF THE INVENTION

Personal information is transferred between an old appliance and a new appliance by use of communication capabilities of the appliances. In one embodiment, telephony capabilities of both appliances are utilized to transfer the personal information. In a further embodiment, a first interface on the old appliance is used to select the information to transfer. A second interface in the new appliance is provided to verify and accept the information prior to finalizing the transfer.

In one embodiment, formats are identified, and the personal information is translated into the format required by the new appliance. In a further embodiment, telephony capabilities of the appliances are used to directly communicate with each other for the transfer of the personal information. Where the appliances will have the same phone number, a third device is provided and stores the personal information via telephony from the old appliance. When the phone number is switched to the new appliance, the third device then provides the personal information to the new appliance.

In one embodiment, the personal information includes user preferences that customize operation of the appliances. The translation of such information operates to customize the new appliance in a manner similar to the old appliance even if the functions available in such appliances are somewhat different.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

A standard appliance, such as a cellular telephone or personal digital assistant or other device capable of benefiting from the present invention is first described, followed by description of a software system that generates transfer of personal information between appliances. The software is written in the form of modules that generally provide a single function or subsets of related functions. However, in various embodiments, the software comprises a single module or many modules, and there is no requirement that functions be grouped together. Hardware and/or firmware is used to implement the invention in further embodiments.

Figure 1:
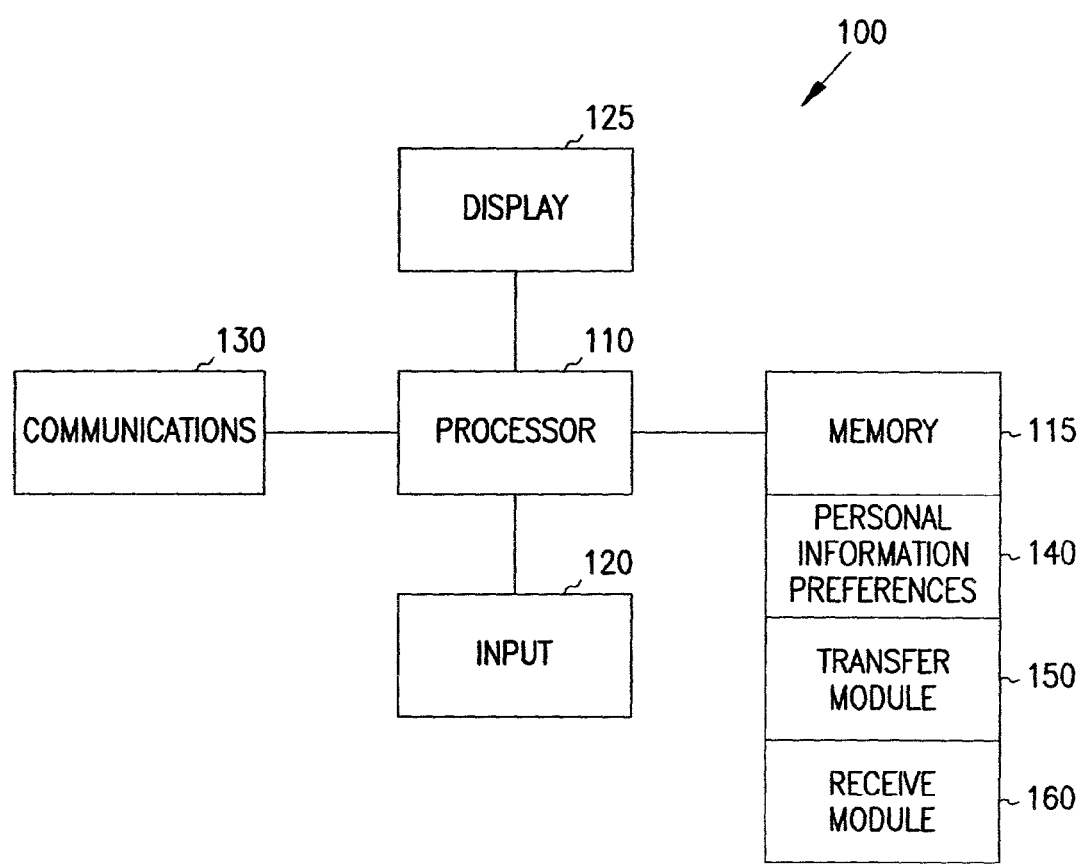
FIG. 1 is a block diagram of an appliance capable of transferring and receiving personal information from another appliance.

FIG. 1 shows a simplified block diagram of an appliance 100 according to the present invention. A processor 110 and memory 115 are coupled together. Memory 115 provides data and programs for execution on processor 110. An input device 120 is coupled to the process to provide user input. The input device may be any type of input device, such as a telephone keypad, keyboard, handwriting and voice recognition devices and other means of providing user input to processor 110. Processor 110 is a microprocessor such as a 486-type chip, a Pentium®, Pentium II® or other suitable low power microprocessor or hardware/firmware circuit capable of performing functions for the appliance 100 as further described. Memory 115 in one embodiment comprises non-volatile RAM (Random-Access Memory) or other non-volatile forms of memory that retain data in the absence of power.

Further memory types may also be used if volatility is not an issue for the appliance. A communications module or device 130 is also coupled to processor 110. In one embodiment, device 130 is a telephony module for providing either cellular telephone capabilities or standard telephone network connectivity. In further embodiments, device 130 comprises a wireless communication or network capability such as radio frequency, cordless phone, or other capability for direct communication with other appliances.

Memory 115 is shown with logical representations of software and data. Personal information 140 represents information that is mostly user unique, and that a user would desire to transfer to a new appliance for use. In one embodiment, the personal information includes preferences for the appliance, such as call forward options, ring signatures, ring volume, speaker volume, caller ID, and other appliance specific preferences for appliance customization, such as answer on open, graphical interface configurations, etc. In a further embodiment, the personal information includes address book information, speed dial numbers, phone lists, passwords, memos, tasks and other similar personal information.

Memory 115 also contains program modules for accomplishing the functions of inter-appliance personal information exchange. A transfer module 150 and a receive module 160 provide the functions of transfer and receiving. It should be noted that the old appliance need only have the transfer module, while the new appliance requires only the receive module until it becomes an old appliance in the next round of upgrading.

Figure 2:
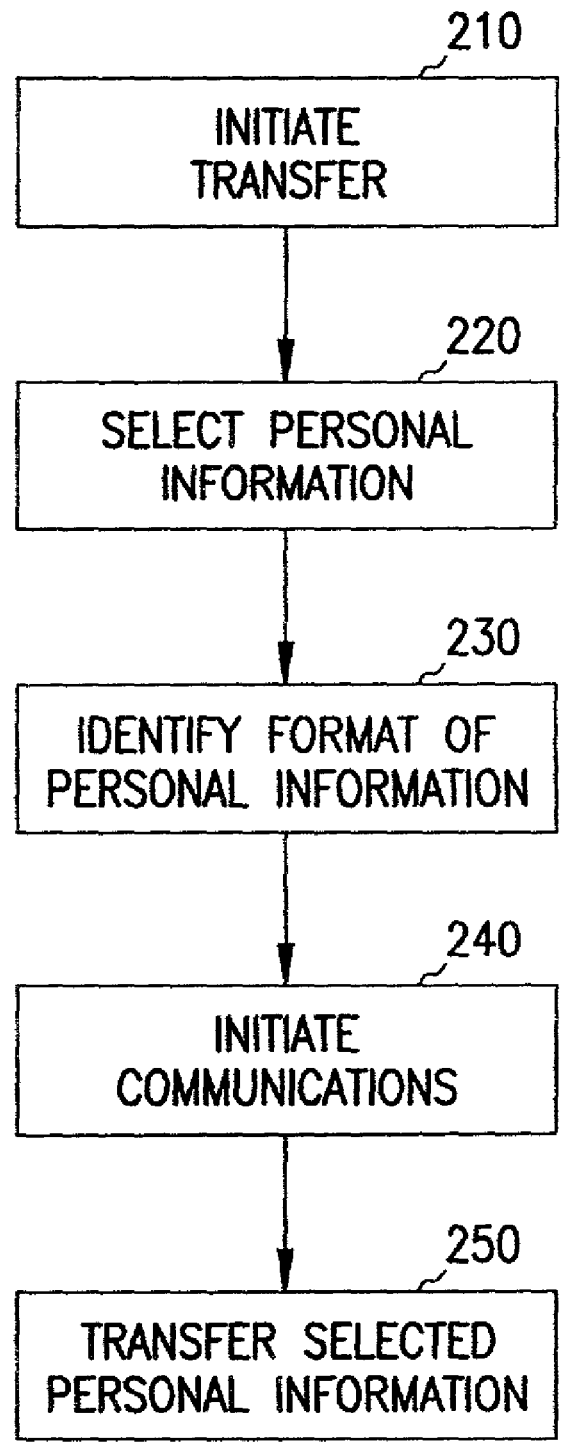
FIG. 2 is a flowchart showing a computer-implemented method of transfer of the personal information in the appliance of FIG. 1.
Figure 3:
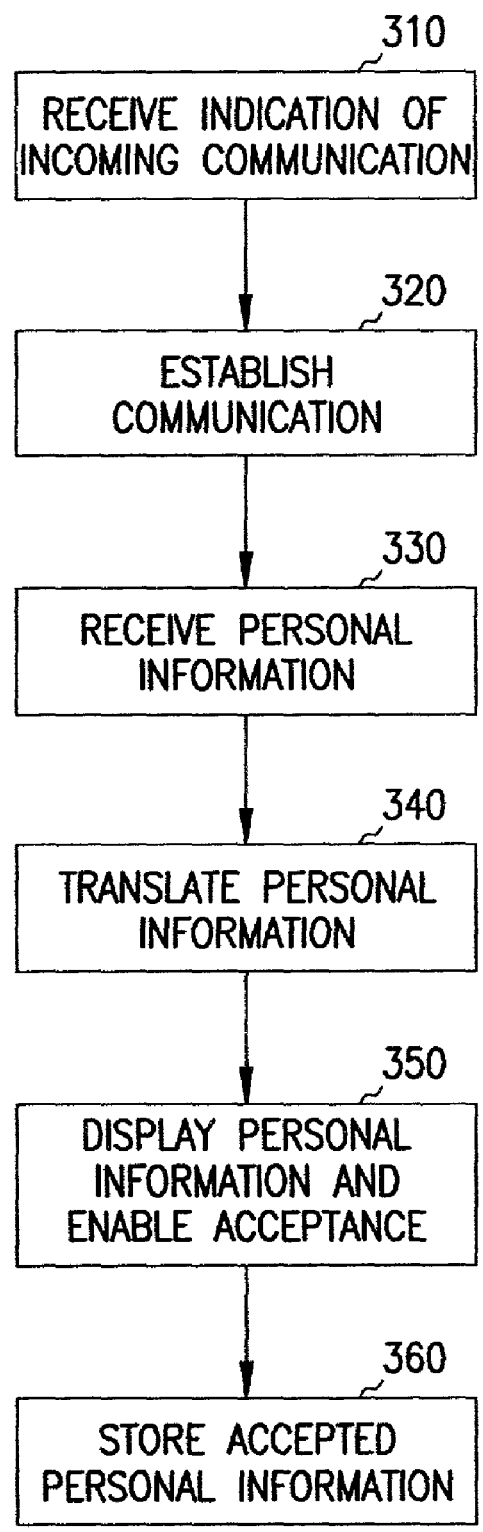
FIG. 3 is a flowchart showing a computer-implemented method of receiving personal information in a further appliance.

The software system that facilitates inter-appliance personal information exchange is represented in flowchart form in FIGS. 2 and 3. The software system executes on processor 110. Software for the system may be stored on any type of computer readable medium, such as disk drive in one embodiment and loaded into memory 115 as needed.

In FIG. 2, a flowchart shows the transfer of personal information from one appliance to another appliance. At 210, a user of an old appliance has obtained a new appliance, and initiates transfer of personal information, such as by selecting a menu transfer option on the old appliance. At 220, a menu or other interface is provided which facilitates the selection of personal information to be transferred from the old appliance to the new appliance. The selection can be as granular as desired, ranging from all personal information to single pieces of personal information. The information in one embodiment is identified based on similar known customization functions in the new appliance. The format of the selected personal information is identified at 230. The format is identified in various embodiments by specifying a known format, or by identifying the device from which the personal information is to be transferred. The identification is communicated to the new appliance such that the new appliance is able to translate the personal information if required. In a further embodiment, no special identification is performed by the transferring appliance, but the new appliance is able to recognize different formats and translate accordingly. Different appliances allocate differing amounts of memory for personal information. For instance, a different number of character slots may be provided for an address. Phone numbers may be stored with parentheses around the area code, or periods between sequences of digits. Data can also be stored in serial or table formats, requiring translation or transformation.

Once the personal information has been selected and identified, communications are initiated at 240. The user is prompted for an identification of the new device or intermediary device in one embodiment. Once communication is established, such as via telephone connection, the selected personal information is transferred to the new appliance. The mode of transfer in one embodiment is one of many well-established digital data packet protocols, such as standard modem or network protocols. In a further embodiment, DTMF (Dual Tone Multiple Frequency) telephone pulses are used to transfer the personal information. In either case, the tones or data in one embodiment is recorded by an intermediate device where the appliances will have the same call address, such as the same telephone number. The personal information is also compressed and/or encrypted in further embodiments prior to communication of it to the new appliance.

The reception of transferred personal information is shown in flowchart form in FIG. 3. At 310, an indication of an incoming communication is received. If an intermediate device is utilized, block 310 is representative of the user initiating communications with the intermediate device. Communications are established at 320. The personal information is then received at 330 and optionally decrypted, uncompressed and verified for accuracy by use of error detection such as a checksum. The personal information is then translated if required at 340 based either on the identification provided by the transferring appliance or based on format identifying characteristics of the received personal information. Following translation, the translated personal information is presented to the user at 350 along with the ability to accept the information. Block 350 represents an installation application that provides for acceptance by the user on an individual or combined basis. In some cases, the space allocated for different types of information may not be sufficient, and decisions as to the data stored are needed. If both appliances are compatible, acceptance and translation are optional. Once accepted, the personal information is stored at 360, and the new appliance is ready for operation in accordance with appliance preferences transferred as part of the personal information.

The translation of information involves matching similar characteristics of each appliance. There may be some features that are not translatable. Therefore, in one embodiment, there are different receive modules available for a given appliance. Each receive module is tailored to one or more appliances. The receive modules are downloaded from a network such as the Internet, or other source of programs by the user as needed. They are loaded directly into the new appliance, or into the transferring appliance and sent to the new appliance with the personal information. The transfer modules are also appliance specific in one embodiment and are similarly loaded as needed.

In further embodiments, the new appliance initiates the transfer of personal information in an interactive manner. A user selects the type of device to transfer information from, and the new appliance queries the transferring appliance for the personal information that is compatible with the new appliance. In still further embodiments, the transferring appliance asks the user, or the new appliance what format is required for the new appliance, and reformats the personal information accordingly. The software system senses common feature sets in the old and new appliances in yet a further embodiment. In still a further embodiment, the old appliance only sends personal information corresponding to similar functions that the new appliance and old appliance share.

Figure 4:
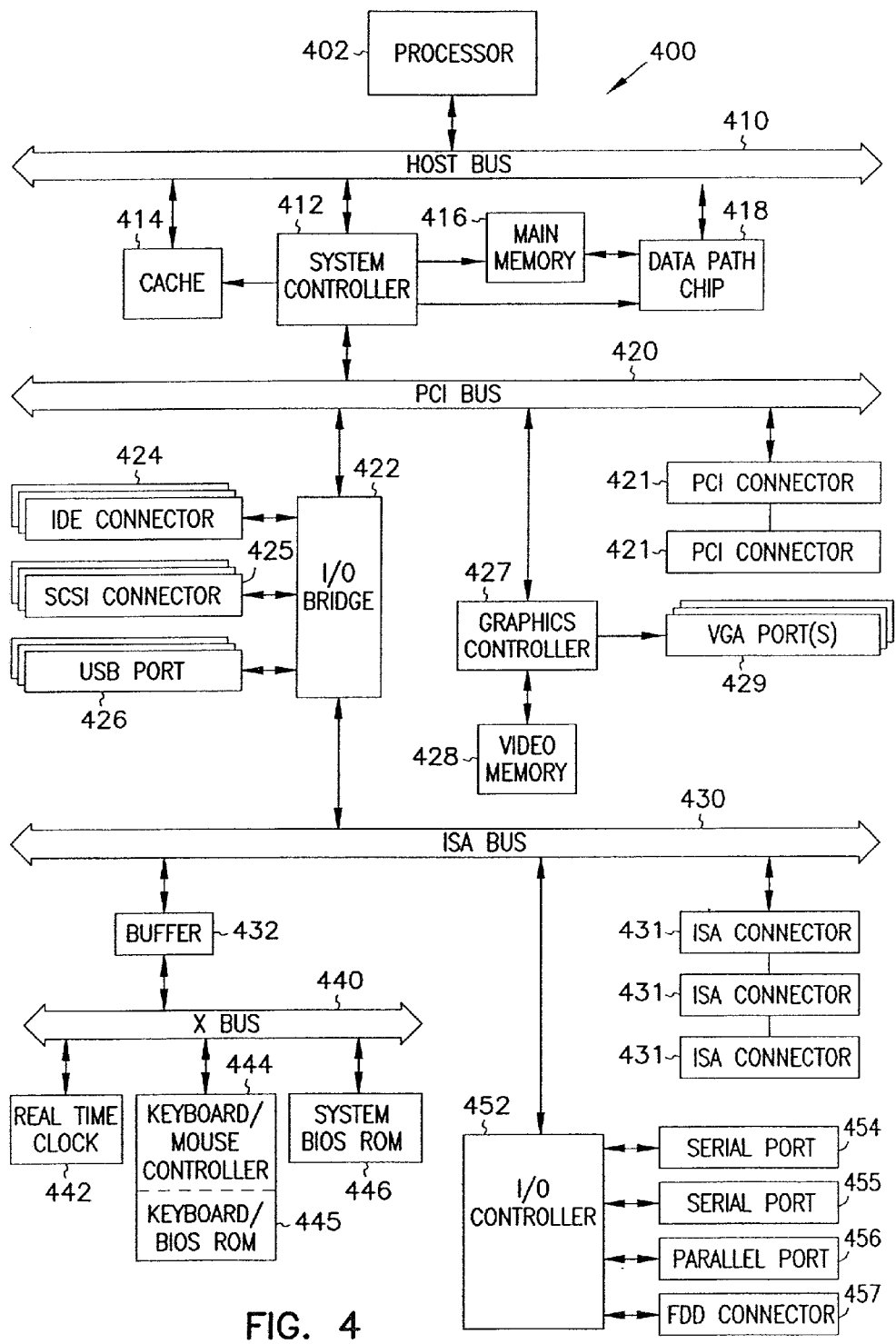
FIG. 4 is a block diagram of the personal computer implementation of the present invention.

FIG. 4 shows a more detailed block diagram of a personal computer system 400 according to the present invention. Personal computers come in all shapes and sizes, from hand held personal digital assistants to laptop, portable, desktop, tower and rack configurations. Such computers are also programmable with personal information, including customization data. Customization data includes data such as color schemes and cursor response controls as well as many others. Personal information is transferred in the same manner as described above in the following personal computer embodiment.

In this embodiment, a processor 402, a system controller 412, a cache 414, and a data-path chip 418 are each coupled to a host bus 410. Processor 402 is a microprocessor such as a 486-type chip, a Pentium®, Pentium II®, Pentium III®, Pentium®4, or other suitable microprocessor. Cache 414 provides high-speed local-memory data (in one embodiment, for example, 512 kB of data) for processor 402, and is controlled by system controller 412, which loads cache 414 with data that is expected to be used soon after the data is placed in cache 412 (i.e., in the near future). Main memory 416 is coupled between system controller 414 and data-path chip 418, and in one embodiment, provides random-access memory of between 16 MB and 128 MB of data. In one embodiment, main memory 416 is provided on SIMMs (Single In-line Memory Modules), while in another embodiment, main memory 416 is provided on DIMMs (Dual In-line Memory Modules), each of which plugs into suitable sockets provided on a motherboard holding many of the other components shown in FIG. 4. Main memory 416 includes standard DRAM (Dynamic Random-Access Memory), EDO (Extended Data Out) DRAM, SDRAM (Synchronous DRAM), or other suitable memory technology. System controller 412 controls PCI (Peripheral Component Interconnect) bus 420, a local bus for system 400 that provides a high-speed data path between processor 402 and various peripheral devices, such as graphics devices, storage drives, network cabling, etc. Data-path chip 418 is also controlled by system controller 412 to assist in routing data between main memory 416, host bus 410, and PCI bus 420.

In one embodiment, PCI bus 420 provides a 32-bit-wide data path that runs at 33 MHz. In another embodiment, PCI bus 420 provides a 64-bit-wide data path that runs at 33 MHz. In yet other embodiments, PCI bus 420 provides 32-bit-wide or 64-bit-wide data paths that runs at higher speeds. In one embodiment, PCI bus 420 provides connectivity to I/O bridge 422, graphics controller 427, and one or more PCI connectors 421 (i.e., sockets into which a card edge may be inserted), each of which accepts a standard PCI card. In one embodiment, I/O bridge 422 and graphics controller 427 are each integrated on the motherboard along with system controller 412, in order to avoid a board-connector-board signal-crossing interface and thus provide better speed and reliability. In the embodiment shown, graphics controller 427 is coupled to a video memory 428 (that includes memory such as DRAM, EDO DRAM, SDRAM, or VRAM (Video Random-Access Memory)), and drives VGA (Video Graphics Adaptor) port 429. VGA port 429 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 421.

In one embodiment, I/O bridge 422 is a chip that provides connection and control to one or more independent IDE connectors 424–425, to a USB (Universal Serial Bus) port 426, and to ISA (Industry Standard Architecture) bus 430. In this embodiment, IDE connector 424 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 424 are provided, and each provide the EIDE (Enhanced IDE) architecture. In the embodiment shown, SCSI (Small Computer System Interface) connector 425 provides connectivity for up to seven or fifteen SCSI-type devices (depending on the version of SCSI supported by the embodiment). In one embodiment, I/O bridge 422 provides ISA bus 430 having one or more ISA connectors 431 (in one embodiment, three connectors are provided). In one embodiment, ISA bus 430 is coupled to I/O controller 452, which in turn provides connections to two serial ports 454 and 455, parallel port 456, and FDD (Floppy-Disk Drive) connector 457. In one embodiment, ISA bus 430 is connected to buffer 432, which is connected to X bus 440, which provides connections to real-time clock 442, keyboard/mouse controller 444 and keyboard BIOS ROM (Basic Input/Output System Read-Only Memory) 445, and to system BIOS ROM 446.

Figure 5:
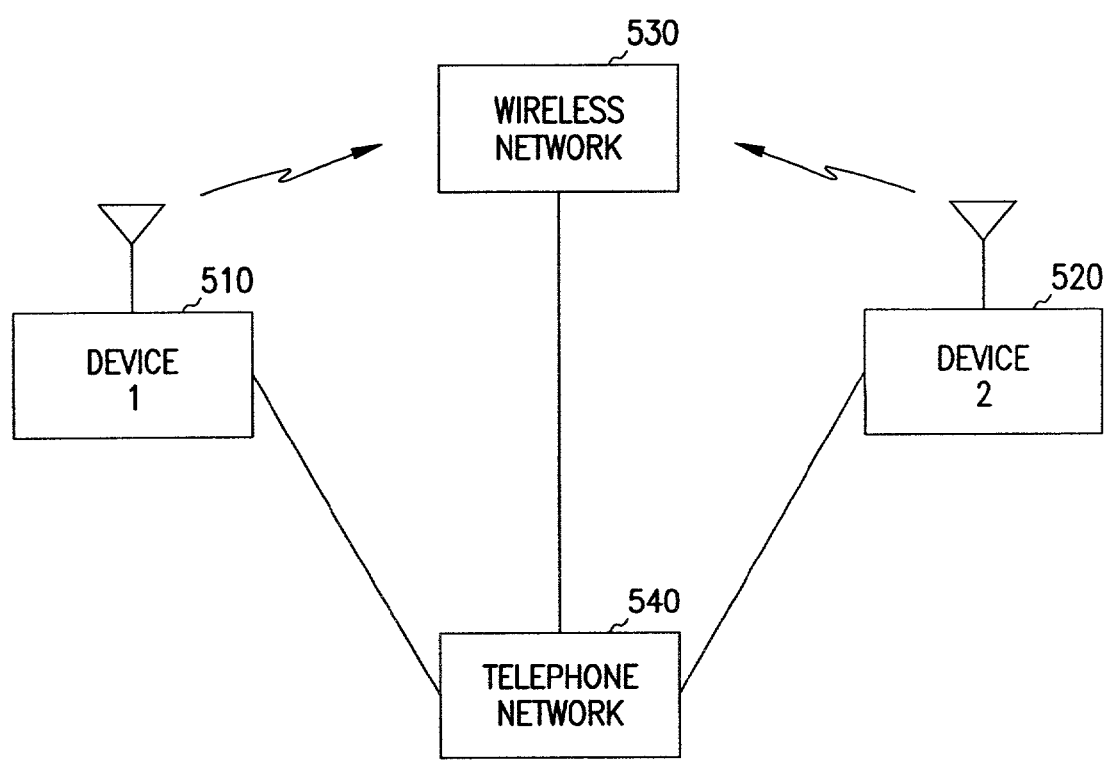
FIG. 5 is a block diagram showing communication of personal information between appliances.

In FIG. 5, a block diagram shows multiple means of communicating between a first appliance 510 and a second appliance 520 for communicating personal information between the appliances. The first appliance 510 communicates via wireless connection to a wireless network represented at 530, or via a telephone network 540. The second appliance 520 is also coupled to at least one of the wireless network 530 and telephone network 540. If the first appliance 510 is being used to initiate transfer of personal information, it may initiate communications with the second device 520 using either the wireless network 530 or the telephone network 540, or yet further method of communication not shown. The second device is capable of using the wireless network 530 or the telephone network 540, or other network to establish communication with the first appliance 520, since the networks communicate directly with each other in one embodiment. Thus, the first appliance may be wired or wireless without regard as to whether the second appliance is wired or wireless.

CONCLUSION

Personal information is transferred between an old appliance and a new appliance by use of communication capabilities of the appliances. A transfer facility on the old appliance is used to select the information to transfer. A receive facility on the new appliance is provided to verify the information prior to finalizing the transfer. The personal information is translated by either facility as desired, and the information is optionally encrypted, compressed and verified. The facilities are downloaded from a network and are modified based on the appliances exchanging personal information. Telephony and wireless communication methods are employed for the exchange in various embodiments.

The appliances are cellular telephones in one embodiment. The user selects a transfer option and places a call to the new cellular telephone. The user then answers the ringing new cellular telephone and the transfer of personal information progresses as described above. If the cellular telephones are to have the same telephone number and only one can be programmed with that number at a time, a third device is called. It may be another cellular telephone, or a special device coupled to a telephone. When the telephone number is programmed into the new cellular phone, the third device transfers the personal information to the new cellular phone in the same manner as above.

Further appliances include personal digital assistants with telephonic capabilities and other such devices. The communication mediums employed by such appliances includes cellular, POTS, IR, RF and other mediums.

While the terms "old appliance" and "new appliance" have been used herein, the terms are meant to refer to an appliance that contains personal information, and an appliance that is to receive the personal information. The terms "old" and "new" are in reference to the temporal use of the appliances by a user, and not the relative ages of the appliances themselves. Thus, the terms "old" and "new" may be easily interchangeable with similar terms such as "first" and "second", "one" and "another", "original" and "replacement" or "upgrade", "previous" and "subsequent" and so on, without departing from the scope of the invention and without providing substantial change or limitation to the invention.

The invention claimed is:

1. A computer based appliance that sends customization information to a new cellular telephony device, the computer based appliance comprising:
   a processor;
   a memory coupled to the processor that stores programs and customization information for a new cellular telephony device where customization information is a customer preference for an operation of the cellular telephony device;
   a communication device for communicating with said new cellular telephony device via a cellular call; and
   a transfer module that (a) retrieves customization information corresponding to similar functions in the new cellular telephony device from the memory, (b) translates the customization information to customize related functions of the new cellular telephony device, and (c) transfers the translated customization information via a cellular call to said new cellular telephony device.

2. The computer based appliance of claim 1 wherein the customer preference is selected from the group consisting of call forward options, ring signatures, ring volume, speaker volume, caller ID, answer on open, and graphical interface configurations.

3. The computer based appliance of claim 1 wherein the transfer module provides a user interface for initiating the transfer of the customization information.

4. The computer based appliance of claim 1 wherein the transfer module performs a function selected from the group of encryption, compression and error detection of the customization information.

5. A computer based appliance that receives customization information from an old cellular telephony device, the computer based appliance comprising:
   a processor;
   a memory coupled to the processor that stores programs and customization information for an old cellular telephony device where the customization information is a customer information for an operation of the cellular telephony device;
   a communication device for communicating with said old cellular telephony device via a cellular call; and
   a receive module that (a) receives the customization information from the old cellular telephony device via a cellular call, (b) translates the customization information to customize related functions of the new cellular telephony device, and (c) stores the translated customization information corresponding to the new cellular telephony device functions in the memory.

6. The computer based appliance of claim 5 wherein the customer preference is selected from the group consisting of call forward options, ring signatures, ring volume, speaker volume, caller ID, answer on open, and graphical interface configurations.

7. The computer based appliance of claim 5 wherein the receive module provides a user interface for accepting the customization information.

8. The computer based appliance of claim 5 wherein the receive module performs a function selected from the group of decryption, decompression and validation of the customization information.

9. A method for transferring customization information between an old cellular telephony device and a new cellular telephony device, the method comprising:
   identifying customization information to transfer from the old cellular telephony device to the new cellular telephony device, the customization information being a customer preference for an operation of the cellular telephony device;
   initiating a cellular call directly between the old and new cellular telephony devices;
   translating the customization information of the old cellular telephony device to a format compatible with the new cellular telephony device; and
   transferring the customization information between the old and new telephony devices via the cellular call.

10. The method of claim 9 and further comprising selectively accepting pieces of the customization information.

11. The method of claim 9 wherein the customer preference is selected form the group consisting of call forward options, ring signatures, ring volume, speaker volume, caller ID, answer on open, and graphical interface configurations.

12. The method of claim 9 wherein and further comprising providing a user interface for accepting customization information.

13. The method of claim 9 wherein the receive module performs a function selected from the group of decryption, decompression and validation of the customization information.

14. A first cellular telephone that receives customization information from a second cellular telephone, the first cellular telephone comprising:
   a processor;
   a memory coupled to the processor that stores programs and customization information which is a customer preference for an operation of the cellular telephony device;
   a cellular based communication device for communicating with said second cellular telephone via a cellular call; and
   a receive module that (a) receives the customization information from the second cellular telephone via a cellular call, (b) translates the customization information to customize related functions of the first cellular telephone and (c) stores the customization information in the memory.

15. The cellular telephone of claim 14 wherein the customer preference is selected from the group consisting of call forward options, ring signatures, ring volume, caller ID, answer on open, and graphical interface configurations.

16. The first cellular telephone of claim 14 wherein the receive module provides a user interface for accepting customization information.

17. The first cellular telephone of claim 14 wherein the receive module performs a function selected from the group of decryption, decompression and validation of the customization information.

18. A computer readable medium having instructions for execution of a method of updating customization personal information on a new cellular telephony device, the method comprising:
   receiving a cellular call from a previous cellular telephony device;

receiving customization information from the previous cellular telephony device via the cellular call, the customization information being a customer preference for an operation of the cellular telephony device;

storing selected customization information in a format compatible with a format of the new cellular telephony device.

19. A computer readable medium having instructions for execution of a method of updating customization information on a new cellular telephony device, the method comprising:

receiving a cellular call from a previous cellular telephony device;

receiving customization information from the previous cellular telephony device via the cellular call, the customization information being a customer preference for an operation of the cellular telephony device;

translating customization information relating to functions which are similar in the new cellular telephony device appliance such that customization preferences are transferred from the old cellular telephony device to the new cellular telephony device.

20. The computer readable medium of claim 19 wherein the customer preference is selected from the group consisting of call forward options, ring signatures, ring volume, speaker volume, caller ID, answer on open, and graphical interface configurations.

21. The computer readable medium of claim 19 and further comprising instructions for obtaining a receive module for translation of customization information between the previous and new cellular telephony devices.

22. A computer readable medium having instructions for execution of a method of sending customization information to a new cellular telephony device appliance from a previous cellular telephony device, the method comprising:

identifying customization information to transfer from the previous cellular telephony device to the new cellular telephony device, the customization information being a customer preference for an operation of the cellular telephony device-translating the customization information to a format directly usable by the new cellular telephony device;

initiating a cellular call to the new cellular telephony device;

sending the customization information from the previous cellular telephony device via the cellular call to the new cellular telephony device.

23. The computer readable medium of claim 22 and further comprising instructions for transferring a receive module to the new cellular telephony device via the cellular call to enable the new cellular telephony device to receive and store the transferred customization information.

* * * * *